United States Patent [19]

Selines

[11] 4,290,293

[45] Sep. 22, 1981

[54] METHOD FOR DEEP DRAWING

[75] Inventor: Ronald J. Selines, Yorktown Heights, N.Y.

[73] Assignee: Union Carbide Corporation, New York, N.Y.

[21] Appl. No.: 103,440

[22] Filed: Dec. 14, 1979

[51] Int. Cl.$^3$ .............................................. B21D 22/20
[52] U.S. Cl. ................................ 72/342; 113/120 H; 148/125
[58] Field of Search ................. 148/125; 72/342, 347, 72/364; 113/120 H

[56] References Cited

U.S. PATENT DOCUMENTS

| | | | |
|---|---|---|---|
| 4,083,220 | 4/1978 | Kobayashi et al. | 72/364 |
| 4,122,700 | 10/1978 | Granzow | 72/342 |
| 4,159,217 | 6/1979 | Selines et al. | 148/125 |

FOREIGN PATENT DOCUMENTS 477874  10/1951  Canada ................................ 148/125

*Primary Examiner*—Lowell A. Larson
*Attorney, Agent, or Firm*—Saul R. Bresch

[57] ABSTRACT

A method for deep drawing sheet wherein (i) the sheet is formable by deep drawing and (ii) the sheet is in the form of a blank having a flange portion and a center portion comprising the following steps:

(a) cooling the blank to a temperature no higher than about minus 50° C.;

(b) heating the flange portion to a temperature higher than the center portion and sufficient to establish a temperature differential between the flange portion and the center portion of about 40° C. to about 150° C.; and (c) drawing the blank into a concave deep drawing die using a mating convex punch, the center portion being initially at a temperature no higher than about 0° C. and the drawing being effected at a speed sufficient to maintain the temperature differential established in step (b).

10 Claims, No Drawings

METHOD FOR DEEP DRAWING

FIELD OF THE INVENTION

This invention relates to a method for deep drawing sheet at cryogenic temperatures.

DESCRIPTION OF THE PRIOR ART

Deep drawing is a well known forming process used to produce both shallow and deep straight wall cups or shells from flat stock, i.e., metal sheet. Materials such as steel, aluminum, copper, and stainless steel each have a characteristic drawability limit which is usually expressed as the ratio (D max/d) of the maximum blank diameter (D max) which can successfully be drawn into a cup of a given diameter (d) or as the maximum percentage reduction possible from the blank diameter to the cup diameter expressed as 100 (1-d/D max). Drawability is also related to the ratio of maximum cup height to cup diameter (h max/d). Consequently, a material's drawability imposes an upper limit to the ratio of cup height to cup diameter (h/d) which can be achieved in a single draw.

In order to increase deep drawability, it has been suggested that the material to be deep drawn be cooled to cryogenic temperatures prior to deep drawing; that the punch used in deep drawing be water-cooled; that the drawing die be heated; or that the center portion of the blank to be deep drawn be work hardened. While improvements in deep drawability have been observed in each of these instances, optimum drawability has not been achieved, particularly with respect to metals or alloys having a face centered cubic crystal structure or a hexagonal close packed crystal structure.

SUMMARY OF THE INVENTION

An object of this invention, therefore, is to improve the ratio h max/d which can be achieved in a single draw thus either obtaining greater design flexibility, or eliminating redraw, or providing process capability for effectively drawing lower cost materials or higher strength materials of reduced gauge.

Other objects and advantages will become apparent hereinafter.

According to the present invention, a method which improves the deep drawability of sheet wherein (i) the sheet if formable by deep drawing and (ii) the sheet is in the form of a blank having a flange portion and a center portion has been discovered comprising the following steps:

(a) cooling the blank to a temperature no higher than about minus 50° C.;

(b) heating the flange portion to a temperature higher than the center portion and sufficient to establish a temperature differential between the flange portion and the center portion of about 40° C. to about 150° C.; and (c) drawing the blank into a concave deep drawing die using a mating convex punch, the center portion being initially at a temperature no higher than about 0° C. and the drawing being effected at a speed sufficient to maintain the temperature differential established in step (b).

DESCRIPTION OF THE PREFERRED EMBODIMENT

A deep drawing operation is one wherein the outer portion or flange of the sheet metal blank is deformed as a result of the application of forces which include a compressive component resulting in an increase in the thickness of the sheet metal at this location. Deep drawing is distinguished from stretch-forming, a stretch-forming operation being one wherein at least part of the sheet metal is deformed as a result of the application of tensile forces resulting in at least a 2 percent decrease in the thickness of the sheet metal at the location at which the stretch-forming is effected. The sheet materials with which we are concerned here are metals and alloys having a face centered cubic (fcc), hexagonal close packed (hcp), or body centered cubic (bcc) structure or any combination thereof, stampable plastic sheet, and stampable composite materials. Examples of suitable metals and alloys are aluminum, copper, and austenitic stainless steels (fcc), zinc and titanium (hcp), and steel and martensitic stainless steels (bcc). Examples of stampable plastic sheet are polycarbonate, polyvinyl chloride, and polypropylene. Examples of composite materials are glass fibre reinforced plastics and various fibre reinforced aluminum sheet materials. The materials are utilized in subject method as sheet, a conventional term used in industry. Sheet is usually available in coils or cut lengths up to 120 inches (3048 mm) in width and under ¼ inch (6.35 mm) in thickness. The sheet, of course, must be such that it is formable by deep drawing. It is used in the form of a blank, which is merely an unformed piece of required size cut from the sheet. Although not discernible from the blank itself, two portions are designated, one being the outer or flange portion and the other being the inner or center portion. The flange portion represents that part of the blank which is in contact with the die prior to actual contact with the punch and becomes the upper part of the cup wall and remaining flange, if any. The center portion of the blank becomes the cup bottom and lower part of the cup wall.

In step (a) the blank is cooled to a temperature no higher than about minus 50° C. and preferably no higher than about minus 100° C. These temperatures can be achieved by carrying out the step in liquid nitrogen (B.P. minus 196° C.); liquid oxygen (B.P. minus 183° C.); liquid argon (B.P. minus 186° C.); liquid neon (B.P. minus 246° C.); liquid hydrogen (B.P. minus 252° C.); or liquid helium (B.P. minus 269° C.). Liquid nitrogen is preferred. A mixture of dry ice and methanol, ethanol, or acetone has a temperature of about minus 79° C. and can also be used. The lower the temperature to which the blank is cooled in step (a), the easier it is to establish the desired temperature differential between the flange and center portion of the blank due to a lowering of its specific heat and, in addition, a higher rate of heat transfer to the flange as a result of contact with the tooling which is at ambient temperature. In addition, the lower the temperature to which the blank is cooled in step (a), the easier it is to maintain a center portion temperature of no higher than about 0° C. and preferably no higher than about minus 50° C. into step (c), and it is essential that a center portion temperature in this range be maintained until this point. Such a low center portion temperature increases the strength of the blank in this region allowing a higher drawing force in step (c) without breakage and, consequently, increased deep drawability.

In step (b), the flange portion is rapidly heated to a temperature higher than the center portion and sufficient to establish a temperature differential between the flange portion and the center portion of about 40° C. to about 150° C. and preferably about 75° C. to about 150° C. This heating step may be accomplished through thermal transfer with the ambient temperature tooling. For example, the first step in many deep drawing operations is to clamp the blank between a blank holder and a die to prevent wrinkling of the flange during deep drawing. This same step can be used to heat the flange portion of the blank since the blank holder and die are at ambient temperature. Heating in this fashion takes place very rapidly, e.g. a maximum temperature differential, 125° C., is established after approximately 0.2 seconds for an aluminum blank having a thickness of 0.020 inch with a conventional oil base deep drawing lubricant applied to both sides of the blank, which had been cooled to minus 196° C. in step (a). The clamping time of 0.2 seconds is meant to serve as a guideline only. The optimum time needed to carry out step (b) is dependent on various factors such as the material from which the blank is made, the blank size and thickness, and the surface finish on the blank together with the material from which the tooling is made, the type and amount of lubricant, and clamping pressure. The optimum clamping time is easily determined for a specific operation, however, simply by varying the press speed until optimum results are achieved. Too high a press speed and an associated short clamping time will not allow sufficient time to heat the flange portion and establish the desired temperature differential thus resulting in no improvement in deep drawability. Too slow a press speed and an associated long clamping time will allow excessive heating of the flange resulting in an equilibration of the temperature differential between the center portion and the flange portion and, again, no improvement in deep drawability. In a continuous operation, it is suggested that, if the need arises, steps be taken to assure that there is no significant lowering of the temperature of the blank holder or the die since this will reduce the rate of heating of the flange portion of the blank and, consequently, reduce the magnitude of the temperature differential. In addition to varying press speed as a means of optimizing clamping time, the length of the blank holder contact time before actual deep drawing is initiated in step (c) can also be varied by changing the distance between the top of the blank holder and the top of the punch. For a given press speed, the contact time will increase as the distance between blank holder and punch increases and decrease as the distance decreases.

Step (c) is then carried out by drawing the blank into a deep drawing die by means of a mating convex punch until part or all of the blank conforms to the shape of the die, the drawing being effected at a speed sufficient to maintain the temperature differential established in step (b). As mentioned above, the center portion in step (c) is initially at a temperature of no higher than about 0° C. and preferably no higher than about minus 50° C. The "speed" of drawing may be referred to as the punch speed or press speed. It should be noted that the drawing operation itself introduces energy into the blank, the majority of which goes into the flange due to higher amount of deformation in this region and results in a desirable further increase in temperature in the flange relative to the center. A further advantage of initially cooling the blank to a low temperature is that the resultant higher strength of the flange leads to a larger heat input due to the drawing deformation and, consequently, an enhanced temperature differential.

It will be understood by those skilled in the art that step (c) defines a conventional deep drawing operation except insofar as it is concerned with the initial temperature of the center portion and maintenance of the temperature differential, and the various techniques available to accomplish deep drawing are contemplated here. For instance, the step can be carried out in a blank and draw press in which blanks are cut from coil stock and then drawn during a single press stroke. Another conventional technique is described as follows: a draw/redraw press in which a blank is cut from coil stock, drawn into a cup, and then redrawn into a cup of smaller diameter during a single press stroke. Further, subject process can be accommodated to any press forming operation that involves an element of deep drawing.

Depending on press speed, type of materials, blank thickness, size and surface finish, and type and amount of lubricant, it may be advantageous to cool the punch to achieve optimum temperature differentials and deep drawability. This can be accomplished by passing a cooling fluid such as liquid or gaseous nitrogen through internal cooling passages located in the punch.

Punch geometry is not critical, and the presses that can be used are hydraulic or mechanically driven, which may be single, double or triple action.

The benefits resulting from subject process include the ability to form deeper or more severely formed piece-parts (the products of deep drawing), enhanced productivity, materials savings through use of higher strength and lighter gauge sheet, and superior strength properties in the finished piece-part. It is recommended that materials which become brittle at low temperatures be cooled to a temperature at which the heating of step (b) will restore the ductility necessary to form the piece-part.

The following examples illustrate the invention:

EXAMPLES 1 TO 9

Subject process is carried out as described above in a single action hydraulic press having the following tool geometry. For the 0.020 inch thick blanks, the die opening and radius are 1.000 inch and 0.125 inch, respectively, and the flat nosed punch has a diameter and nose radius of 0.944 inch and 0.109 inch respectively. For the 0.040 and 0.063 inch thick blanks the die opening and radius are 1.000 inch and 0.281 inch respectively, and the flat nosed punch has a diameter and nose radius of 0.824 inch and 0.188 inch respectively. In order to determine the deep drawability limit of a given material, the diameter of the blanks is increased in increments of 0.050 inch until breakage at the punch nose occurs. Blank holder pressure is maintained at an arbitrary value to control wrinkling in the flange. When this critical diameter is reached, blank holder pressure is gradually reduced until either the cup is successfully drawn or wrinkling in the flange is noted. If successful drawing is achieved, the next largest sized blank is drawn and blank holder pressure is again varied to determine whether this size blank can be successfully deep drawn under the specific test conditions being evaluated. Using this procedure, the largest diameter blank which can be deep drawn into a cup with a 1.000 inch outside diameter without breakage or wrinkling is determined. The blanks are cooled as per step (a) to minus 196° C. by immersion in a bath of liquid nitrogen. The entire blank except for the center portion over the die opening is clamped between the die face and blankholder with a force which varies between 250 and 750 pounds. Blankholder force is supplied via a conventional pneumatic die cushion. The blank holder and die are initially at ambient temperature, and thermal transfer from this tooling to the flange of the blank results in the creation of a temperature differential (step (b)) of about 125° C. for 0.020 inch thick blanks and about 80° C. for 0.040 and 0.063 inch thick blanks as measured by thermocouples located 0.125 inch on either side of the boundary between the clamped and unclamped regions. The maximum temperature differential is established in approximately 0.2 seconds, and a temperature differential of at least 40° C. is maintained for at least about 1 second after that. The press speed is such that contact with the punch signalling the beginning of the actual deep drawing deformation occurs 0.2 seconds after clamping which is the point at which the maximum temperature differential exists. The temperature of the center portion of the blank at the beginning of step (c) is less than minus 125° C. at the 0.2 second mark. In order to maintain as large a temperature differential as possible throughout the entire deep drawing operation, the punch is maintained at a temperature of minus 196° C. by means of internal cooling passages into which liquid nitrogen is introduced. The alloy description, sheet thickness in inches, press speed in inches per second, D max/d, and h max/d are given in Table I below. Examples 1 to 6 are aluminum alloys and the number designations given may be found in "Aluminum Standards and Data 1976" published by the Aluminum Association Incorporated. This publication gives the chemistry and other characteristics of the alloys. Example 7 is directed to electrolytic tough pitch copper sheet and is designated ETP. The copper sheet is in the fully annealed condition.

Examples 8 and 9 are directed to steel alloys designated as 1010, whose chemistry and characteristics may be found in "Metals Handbook", Volume I, 1978, published by the American Society for Metals. D max/d and h max/d are defined at the beginning of the specification.

TABLE I

| Example | Alloy | Sheet Thickness (inch) | Press Speed (inches per second) | D max/d | h max/d |
|---|---|---|---|---|---|
| 1 | 3003-H19 | 0.020 | 2 | 2.1 | 0.96 |
| 2 | 5052-0 | 0.020 | 2 | 2.25 | 1.08 |
| 3 | 5052-H18 | 0.020 | 2 | 2.05 | 0.89 |
| 4 | 3003-H19 | 0.040 | 2 | 2.20 | 1.07 |
| 5 | 5182-0 | 0.040 | 2 | 2.35 | 1.29 |
| 6 | 5052-0 | 0.063 | 2 | 2.25 | 1.30 |
| 7 | ETP | 0.063 | 2 | 2.05 | 1.03 |
| 8 | 1010 | 0.020 | 2 | 2.3 | 1.19 |
| 9 | 1010 | 0.040 | 0.25 | 2.3 | 1.22 |

EXAMPLES 10 TO 15

These examples are submitted for the purpose of comparing a technique suggested by the prior art with subject process. Examples 1 to 6 are repeated except that the blank is at ambient temperature during clamping and no temperature differential is established prior to deep drawing. In these examples, however, the punch is cooled by passing liquid nitrogen through internal cooling passages located in the punch as a means of establishing a temperature differential. The variables are set forth in Table II.

TABLE II

| Example | Alloy | Sheet Thickness (inches) | Press Speed (inches per second) | D max/d | h max/d |
|---|---|---|---|---|---|
| 10 | 3003-H19 | 0.020 | 2 | 1.8 | 0.63 |
| 11 | 5052-0 | 0.020 | 2 | 1.9 | 0.73 |
| 12 | 5052-H18 | 0.020 | 2 | 1.75 | 0.60 |
| 13 | 3003-H19 | 0.040 | 2 | 1.65 | 0.57 |
| 14 | 5182-0 | 0.040 | 2 | 1.80 | 0.75 |
| 15 | 5052-0 | 0.063 | 2 | 1.75 | 0.74 |

EXAMPLES 16 AND 17

Examples 8 and 9 are repeated in accordance with the conditions of examples 10 to 15. The variables are set forth in Table III.

TABLE III

| Example | Alloy | Sheet Thickness (inch) | Press Speed (inches per second) | D max/d | h max/d |
|---|---|---|---|---|---|
| 16 | 1010 | 0.020 | 0.05 | 2.3 | 1.19 |
| 17 | 1010 | 0.040 | 0.05 | 2.3 | 1.22 |

Although D max/d and h max/d are found to be the same as for examples 8 and 9, the advantage in subject process insofar as steel is concerned lies in the press speed, the press speed in examples 8 and 9 being, respectively, 40 times and 5 times as fast as that in Examples 16 and 17 to achieve the same D max/d and h max/d.

I claim:
1. A method for deep drawing sheet wherein (i) the sheet is formable by deep drawing and (ii) the sheet is in the form of a blank having a flange portion and a center portion comprising the following steps;
    (a) cooling the blank to a temperature no higher than about minus 50° C.;
    (b) heating the flange portion to a temperature higher than the center portion and sufficient to establish a temperature differential between the flange portion and the center portion of about 40° C. to about 150° C.; and
    (c) drawing the blank into a concave drawing die using a mating convex punch, the center portion being initially at a temperature no higher than about 0° C. and the drawing being effected at a speed sufficient to maintain the temperature differential established in step (b).
2. The process defined in claim 1 wherein the sheet is metal or alloy and has a face centered cubic crystal structure.
3. The process defined in claim 1 where the sheet is metal or alloy and has a body centered cubic crystal structure.
4. The process defined in claim 1 wherein the sheet is metal or alloy and has a hexagonal close packed crystal structure.
5. The process defined in claim 1 wherein the sheet is a stampable plastic.
6. The process defined in claim 1 wherein the sheet is a stampable composite material.
7. The process defined in claim 1 wherein the temperature in step (a) is no higher than about minus 100° C.
8. The process defined in claim 7 wherein the temperature differential in step (b) is about 75° C. to about 150° C. and the initial temperature of the center portion in step (c) is no higher than about minus 50° C.
9. The process defined in claim 8 wherein the sheet is a metal or alloy having a face centered cubic crystal structure.
10. The process defined in claim 9 wherein the sheet is aluminum or an aluminum alloy.

* * * * *